(12) United States Patent
Dandoko

(10) Patent No.: US 11,200,014 B2
(45) Date of Patent: Dec. 14, 2021

(54) DISPLAY DEVICE AND DISPLAY SYSTEM FOR INCREASING TRANSPARENCY OF AN OBJECT IN FIRST AND SECOND SCREENS

(71) Applicant: KYOCERA Document Solutions Inc., Osaka (JP)

(72) Inventor: Takushi Dandoko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/925,860

(22) Filed: Jul. 10, 2020

(65) Prior Publication Data
US 2021/0011675 A1    Jan. 14, 2021

(30) Foreign Application Priority Data
Jul. 12, 2019 (JP) .............................. JP2019-130119

(51) Int. Cl.
*G06F 3/12* (2006.01)
*H04N 1/00* (2006.01)
*G06F 3/0482* (2013.01)
*G06F 3/0484* (2013.01)

(52) U.S. Cl.
CPC .......... *G06F 3/1256* (2013.01); *G06F 3/0482* (2013.01); *G06F 3/04847* (2013.01); *H04N 1/00392* (2013.01); *H04N 1/00413* (2013.01)

(58) Field of Classification Search
CPC .... G06F 3/1256; G06F 3/0482; G06F 3/0487; G06F 3/0485; H04N 1/00413; H04N 1/00392
See application file for complete search history.

(56) References Cited

U.S. PATENT DOCUMENTS

| | | | |
|---|---|---|---|
| 9,292,188 B2 | 3/2016 | Horiike | |
| 9,891,790 B2* | 2/2018 | Jiang | G06F 3/04842 |
| 2013/0139100 A1 | 5/2013 | Horiike | |
| 2015/0293667 A1* | 10/2015 | Eppolito | G06F 3/0482 715/765 |
| 2017/0255381 A1* | 9/2017 | Nakaizawa | G06F 3/0485 |
| 2017/0285933 A1* | 10/2017 | Oh | G06F 3/0485 |

FOREIGN PATENT DOCUMENTS

JP    2013-114559 A    6/2013

* cited by examiner

*Primary Examiner* — Juan M Guillermety
(74) *Attorney, Agent, or Firm* — Studebaker & Brackett PC

(57) ABSTRACT

A display device includes a display section, an operation section, and a controller. The display section displays a screen. The operation section receives a first operation by which a display target area of the screen is changed. The controller changes the display target area of the screen in response to the operation section receiving the first operation. The screen includes an object. The object receives a second operation by which the display target area of the screen is changed. In response to the operation section receiving the first operation, the controller causes the object not to be displayed or increases a transparency of the object.

1 Claim, 9 Drawing Sheets

DISPLAY DEVICE AND DISPLAY SYSTEM FOR INCREASING TRANSPARENCY OF AN OBJECT IN FIRST AND SECOND SCREENS

INCORPORATION BY REFERENCE

The present application claims priority under 35 U.S.C. § 119 to Japanese Patent Application No. 2019-130119, filed on Jul. 12, 2019. The contents of this application are incorporated herein by reference in their entirety.

BACKGROUND

The present disclosure relates to a display device and a display system.

Recently, information processing devices including touch sensors have been utilized. Such an information processing device including a touch sensor displays a list of arbitrary contents on a screen. In order to select one of the arbitrary contents, a user makes a flicking operation or the like to scroll the list of the contents and search for target content.

A certain information processing device includes a touch panel, a display, and a central processing unit (CPU). The display displays a screen through which an address, which is an address for email transmission, is to be selected. The screen includes an address list and a scroll bar. Upon the touch panel receiving a flicking operation, the CPU scrolls the address list. The CPU determines whether or not each of addresses displayed through the scrolling is an address satisfying a specific condition. An address satisfying the specific condition is an address that has been utilized as an address for email transmission a specific number of times or more in a given period. During scrolling of the address list, the CPU changes the size of a portion of the address list that corresponds to the address satisfying the specific condition to a size larger than the other portion of the address list.

SUMMARY

A display device according to an aspect of the present disclosure includes a display section, an operation section, and a controller. The display section displays a screen. The operation section receives a first operation. The first operation changes a display target area of the screen. The controller changes the display target area of the screen in response to the operation section receiving the first operation. The screen includes an object. The object receives a second operation by which the display target area of the screen is changed. In response to the operation section receiving the first operation, the controller causes the object not to be displayed or increase a transparency of the object.

A display system according to an aspect of the present disclosure includes an image forming apparatus and an information processing device. The information processing device executes remote control on the image forming apparatus. The image forming apparatus includes a first display section, a first controller, and a first communication section. The first display section displays a first screen. The first controller causes the first display section to display the first screen based on screen information representing the first screen. The first communication section transmits the screen information to the information processing device. The information processing device includes a second display section, a second communication section, a second controller, and an operation section. The second display section displays a second screen. The second communication section receives the screen information. The second controller causes the second display section to display the second screen based on the screen information. The operation section receives a first operation by which a display target area of the second screen is changed. The first screen and the second screen each include an object. The object receives a second operation by which the respective display target areas of the first screen and the second screen are changed. In response to the operation section receiving the first operation, the second controller causes the second communication section to transmit operation information indicating the first operation to the image forming apparatus. The first communication section receives the operation information from the information processing device. In response to the first communication section receiving the operation information, the first controller causes the object included in each of the first screen and the second screen not to be displayed or increases a transparency of the object included in each of the first screen and the second screen.

DESCRIPTION OF EMBODIMENTS

Figure 1:
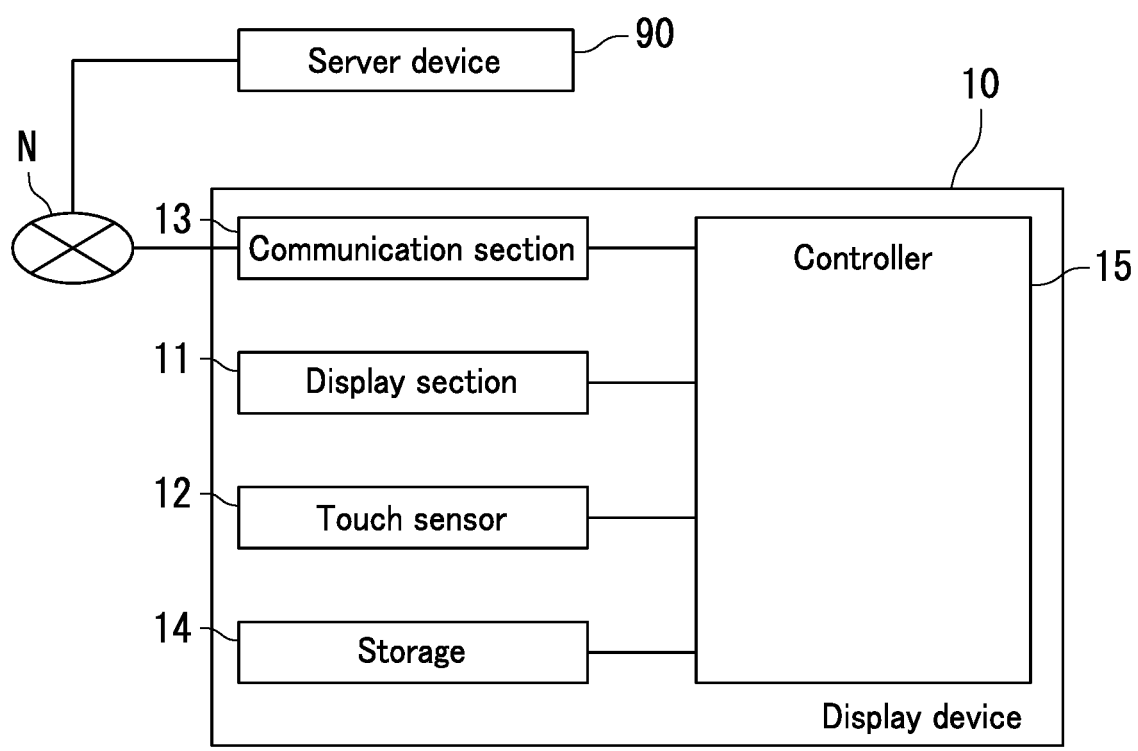
FIG. 1 is a diagram illustrating a configuration of a display device according to a first embodiment of the present disclosure.

The following describes embodiments of a display device and a display system according to the present disclosure with reference to the accompanying drawings. Note that elements that are the same or equivalent are indicated by the same reference signs in the drawings and description thereof is not repeated.

First Embodiment

A display device 10 according to a first embodiment will be described first with reference to FIG. 1. FIG. 1 is a diagram illustrating a configuration of the display device 10 according to the first embodiment.

As illustrated in FIG. 1, the display device 10 includes a display section 11, a touch sensor 12, a communication section 13, storage 14, and a controller 15. The display device 10 is for example a smartphone or a personal computer (PC). The touch sensor 12 is an example of an operation section.

The display section 11 has a display surface. The display surface displays various types of screens. The display section 11 is for example a liquid-crystal display panel or an organic electroluminescent (EL) display panel.

The display section 11 displays a search screen A which will be described with reference to FIGS. 2 to 4. Specifically, the display section 11 displays a portion of the search screen A. The portion of the search screen A that is displayed on the display section 11 is changed by a first operation. The first operation is a user operation which causes scrolling of the search screen A. In the first embodiment, the scrolling is an operation of the display device 10 through which the portion of the search screen A that is displayed on the display section 11 is moved in a horizontal direction or a vertical direction. In the following description, the first operation will be referred to as a "scrolling operation". Also, the portion of the search screen A that is displayed on the display section 11 will be referred to as a "display target area A1".

The touch sensor 12 receives an instruction from a user. The touch sensor 12 detects a user touch on the display surface of the display section 11, and generates a signal indicating a touch position (position where the user touches). The user is allowed to input various instructions to the display device 10 by making gestures. The touch sensor 12 adopts an electrostatic capacitance method or a resistive film method, for example. A detection target, which makes a touch on the display surface of the display section 11, is for example a stylus or a finger of the user operating the display device 10, for example.

Examples of the gestures include a tapping operation, a dragging operation, a swiping operation, a momentum scrolling operation, and a pinching operation. For example, the touch sensor 12 receives the scrolling operation. Specifically, the scrolling operation includes a swiping operation and a momentum scrolling operation. In the first embodiment, the swiping operation is an operation by a user who stops the finger moving on the display surface of the display section 11 and then removes the finger from the display surface. The momentum scrolling operation is a gesture to cause the screen to be inertially scrolled (inertial scrolling). Specifically, the momentum scrolling operation is an operation in which the user removes the finger touching the display surface of the display section 11 from the display surface without stopping movement of the finger in removal of the finger from the display surface. By the momentum scrolling operation, the display target area A1 continues moving even after the user removes the finger from the display surface of the display section 11. More specifically, the display target area A1 moves while decelerating its movement after the user removes the finger from the display surface. Then, the display target area A1 finally stops moving. Note that duration of the display target area A1 continuing to be moved in response to such a momentum scrolling operation is determined according to moving speed of the user's finger on the display surface of the display section 11. Movement speed of the display target area A1 moved by the momentum scrolling operation is also determined according to the movement speed of the user's finger moving on the display surface of the display section 11. A movement direction of the display target area A1 moved by the momentum scrolling operation is determined according to a direction of the user's finger moving on the display surface of the display section 11.

The communication section 13 is connected to a server device 90 in a mutually communicable manner via a network N. For example, the communication section 13 requests the server device 90 to provide screen information and receives the screen information from the server device 90. The screen information indicates the search screen A, for example. The network N is for example a local area network (LAN), the Internet, or a telephone network. The communication section 13 is a communication interface. The server device 90 is an example of an external terminal.

The storage 14 stores a control program and data therein. The storage 14 is constituted by a storage device and semiconductor memory. The storage device is constituted for example by either or both a hard disk drive (HDD) and a solid-state drive (SSD). The semiconductor memory includes random-access memory (RAM) and read-only memory, for example.

The controller 15 is a hardware circuit including a processor such as a central processing unit (CPU). The controller 15 controls each operation of the display section 11, the communication section 13, and the storage 14 through execution of the control program.

The controller 15 uses each of a non-display mode, a first transparency increasing mode, a second transparency increasing mode, and a normal mode as an operation mode thereof. Through an operating mode selection screen 300, which will be described with reference to FIG. 5, one of the non-display mode, the first transparency increasing mode, the second transparency increasing mode, and the normal mode is selected as the operation mode.

The non-display mode will be described next with reference to FIGS. 1 to 3. FIG. 2 is a diagram illustrating a display screen 100 displayed on the display section 11 in the first embodiment. FIG. 3 is a diagram illustrating the display screen 100 during scrolling. Specifically, FIG. 3 illustrates a state in which the display target area A1 of the search screen A is scrolled downward.

Figure 2:
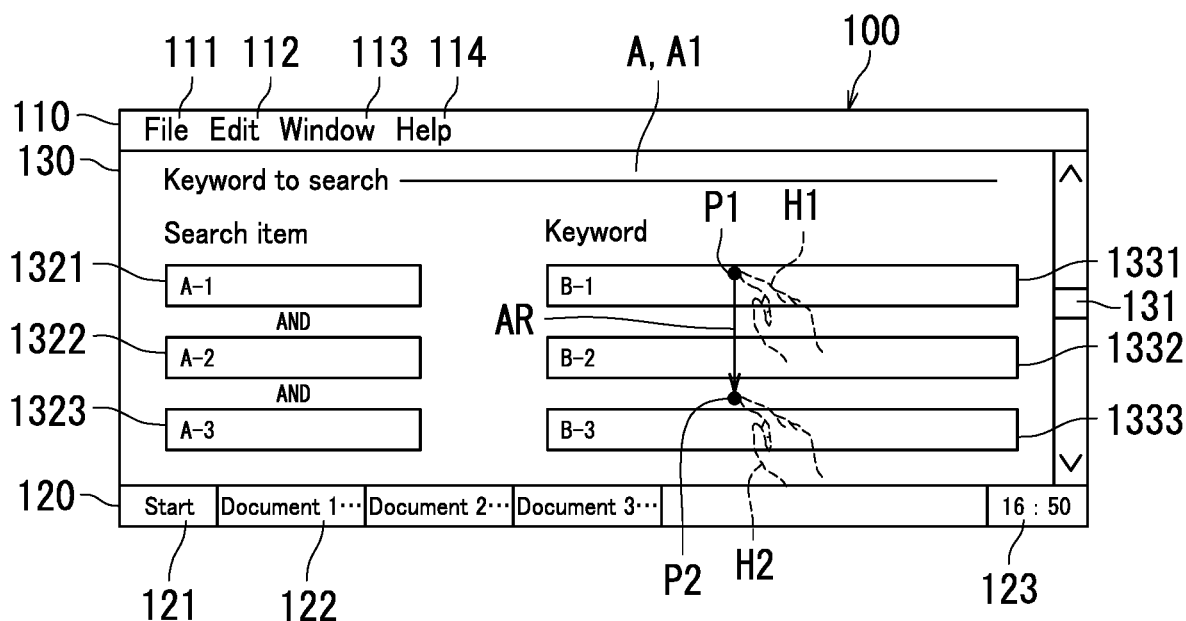
FIG. 2 is a diagram illustrating a display screen displayed on a display section in the first embodiment of the present disclosure.

As illustrated in FIG. 2, the display screen 100 displays a menu bar 110, a task bar 120, and an area 130 in which the display target area A1 of the search screen A is displayed. In the following description, the area 130 of the display screen 100 in which the display target area A1 of the search screen A is displayed may be referred to as a "display area 130". The display area 130 has an area smaller than that of the search screen A. The menu bar 110 is located in an upper part of the display screen 100. The task bar 120 is located in a lower part of the display screen 100. The display area 130 of the search screen A is located between the menu bar 110 and the task bar 120 in a vertical direction of the display screen 100.

The menu bar 110 includes a file button 111, an edit button 112, a window button 113, and a help button 114. The task bar 120 includes a start button 121, three task buttons 122, and a task tray 123.

The display screen 100 additionally displays a scroll bar 131. The scroll bar 131 is located on the right side of the display area 130 of the search screen A. The display target area A1 of the search screen A is changed by a second operation. In the first embodiment, the second operation is an operation by the user pressing down the scroll bar 131. The display target area A1 of the search screen A moves in response to the second operation. The scroll bar 131 is an example of an object.

The display target area A1 illustrated in FIG. 2 includes first to third search item input areas 1321 to 1323 and first to third keyword input areas 1331 to 1333. The first to third search item input areas 1321 to 1323, the first to third keyword input areas 1331 to 1333, and the scroll bar 131 are arranged in the stated order from the left to the right of the display area 130 of the search screen A. Each of the first to third search item input areas 1321 to 1323 is an area in which a search item is to be entered. The search item is an item classified according to specific genre. Each of the first to third keyword input areas 1331 to 1333 is an area in which a keyword is to be entered.

The following describes a situation in which a scrolling operation is performed in an area of the display area 130 of the search screen A. As illustrated in FIG. 2, a finger of a hand H1 of the user first touches a point P1 in any area of the display area 130 of the search screen A. The user moves the finger of the hand H1 downward to a point P2 as indicated by an arrow AR while keeping the finger in touch with the display surface of the display section 11. Next, the user removes the finger of the hand, which is denoted by H2, at the point P2 from the display surface of the display section 11. The touch sensor 12 illustrated in FIG. 1 outputs to the controller 15 a signal indicating that the finger in touch on the point P1 is moved to the point P2 and then removed at the point P2. Upon performance of a swiping operation such as above, the controller 15 determines that the touch sensor 12 receives a scrolling operation. Note that the hands H1 and H2, the points P1 and P2, and the arrow AR illustrated in FIG. 2 are not displayed on the display surface of the display section 11.

Figure 3:
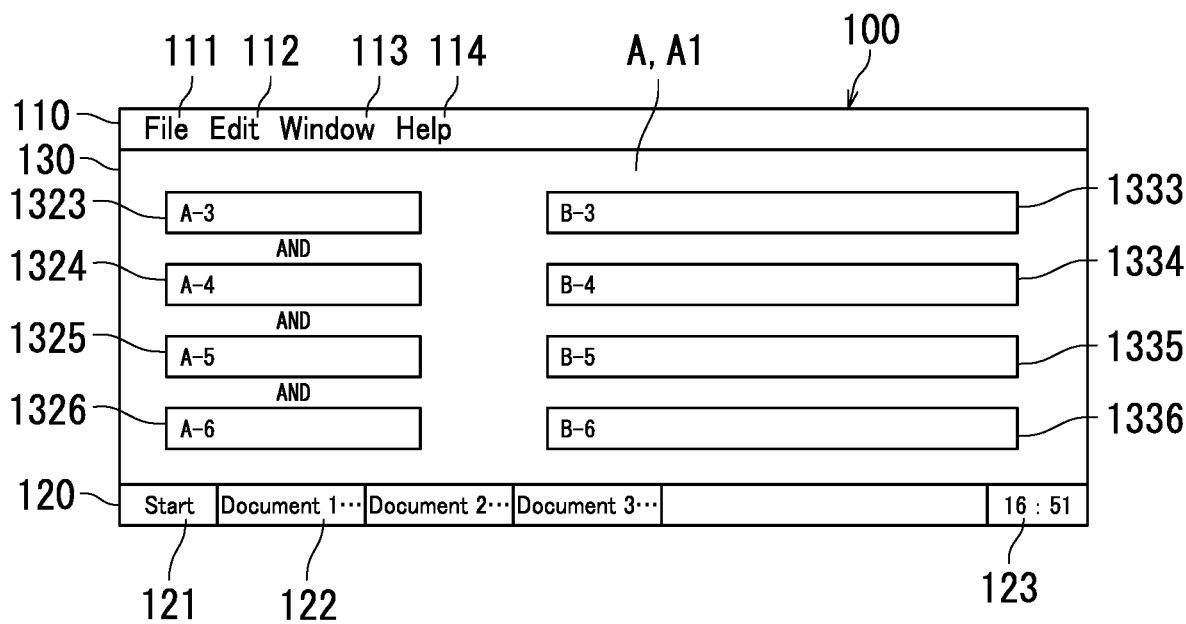
FIG. 3 is a diagram illustrating the display screen during scrolling.

As illustrated in FIG. 3, the display screen 100 keeps displaying the menu bar 110 and the task bar 120. During the scrolling operation, the display target area A1 of the search screen A displayed in the display area 130 of the display screen 100 changes. The display target area A1 illustrated in FIG. 3 includes the third search item input area 1323, fourth to sixth search item input areas 1324 to 1326, the third keyword input area 1333, and fourth to sixth keyword input areas 1334 to 1336. In a situation in which the operating mode of the controller 15 is set to the non-display mode, the scroll bar 131 is not displayed in the display screen 100 during scrolling, unlike the display screen 100 before scrolling.

Specifically, in a situation in which the operating mode is set to the non-display mode, the controller 15 executes non-display processing. The non-display processing is processing through which the scroll bar 131 is not displayed during the time when the display target area A1 of the search screen A is changed in response to the touch sensor 12 receiving a scrolling operation.

Figure 4:
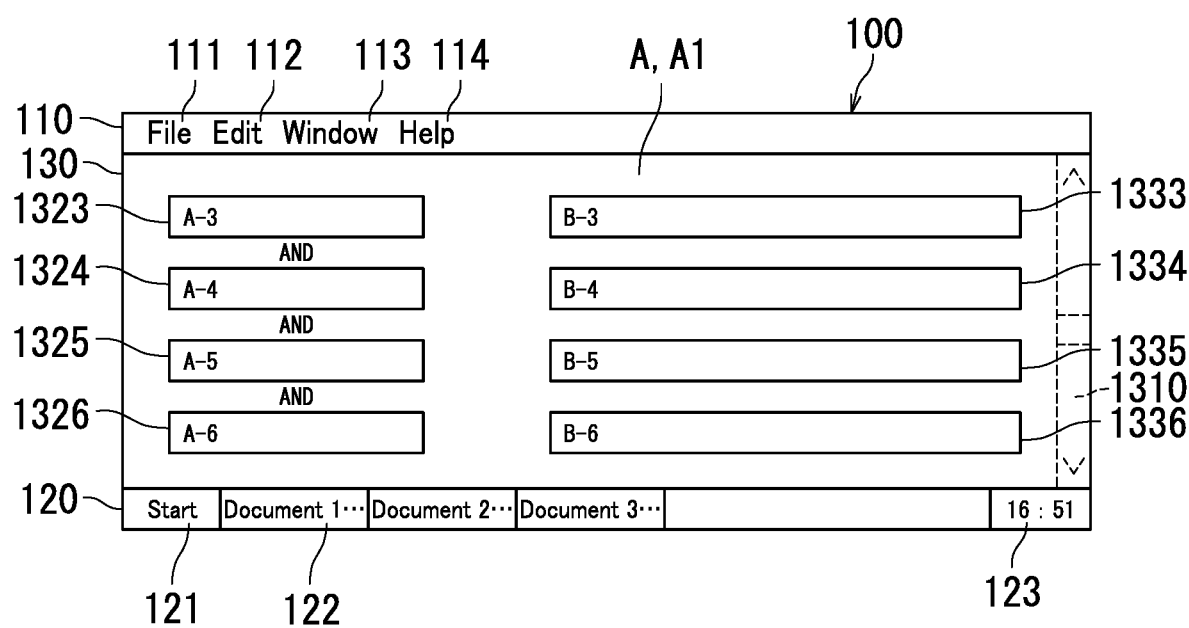
FIG. 4 is a diagram illustrating the display screen during scrolling.

The following describes a first transparency increasing mode with reference to FIGS. 1, 2, and 4. FIG. 4 is a diagram illustrating the display screen 100 when being scrolled. As illustrated in FIG. 4, in a situation in which the operating mode of the controller 15 is set to the first transparency increasing mode, a translucent scroll bar 1310 is displayed on the display screen 100 in place of the scroll bar 131. The translucent scroll bar 1310 is a scroll bar (icon) with a transparency higher than that of the scroll bar 131.

Specifically, in a situation in which the operating mode is set to the first transparency increasing mode, the controller 15 executes first transparency increasing processing. The first transparency increasing processing is processing through which the translucent scroll bar 1310 is displayed during the time when the display target area A1 of the search screen A is changed in response to the touch sensor 12 receiving a scrolling operation. Specifically, the controller 15 increases the transparency of the scroll bar 131 to a specific transparency. The transparency is a degree of how an object other than the scroll bar 131 is seen through the scroll bar 131 in a screen displayed on the display. Here, the object is overlapped with and located below the scroll bar 131 in the screen displayed on the display section 11. Visibility, for the user, of the object below the scroll bar 131 through the scroll bar 131 located over the object increases with an increase in the transparency of the scroll bar 131.

The following describes the second transparency increasing mode. In a situation in which the operating mode is set to the second transparency increasing mode, the controller 15 executes second transparency increasing processing. The second transparency increasing processing is processing through which the transparency of the scroll bar 131 is increased during the time when the display target area A1 of the search screen A is inertially scrolled. Specifically, the controller 15 increases the transparency of the scroll bar 131 as ceasing of the inertial scrolling approaches. When movement of the display target area A1 of the search screen A stops, the controller 15 returns the transparency of the scroll bar 131 to the initial level.

The following describes the normal mode. When the operating mode is set to the normal mode, the controller 15 executes normal processing. The normal processing is processing through which the scroll bar 131 is displayed in an unchanged manner even upon the touch sensor 12 receiving a scrolling operation.

Figure 5:
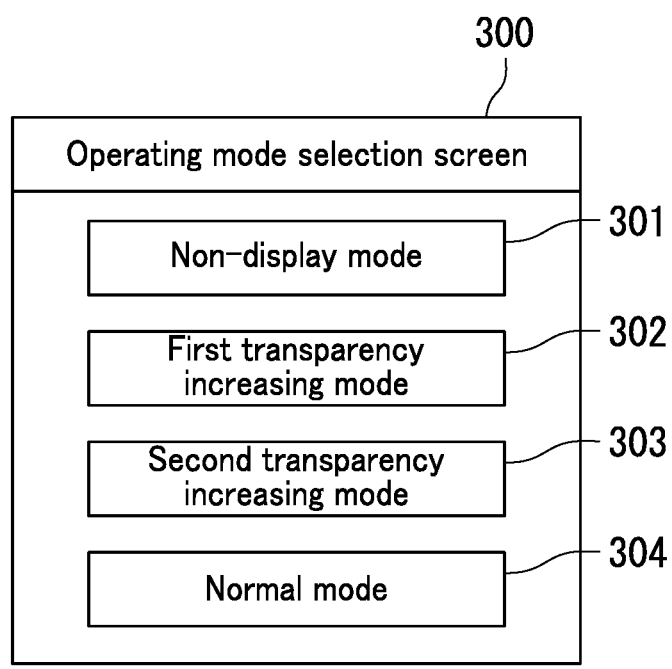
FIG. 5 is a diagram illustrating an operation mode selection screen displayed on the display section in the first embodiment of the present disclosure.

The following describes a process through which an operation mode is selected with reference to FIG. 5. FIG. 5 is a diagram illustrating the operating mode selection screen 300 displayed on the display section 11. The operating mode selection screen 300 includes a non-display mode button 301, a first transparency increasing mode button 302, a second transparency increasing mode button 303, and a normal mode button 304. When the non-display mode button 301 is pressed down, the controller 15 sets the operating mode to the non-display mode. When the first transparency increasing mode button 302 is pressed down, the controller 15 sets the operating mode to the first transparency increasing mode. When the second transparency increasing mode button 303 is pressed down, the controller 15 sets the operating mode to the second transparency increasing mode. When the normal mode button 304 is pressed down, the controller 15 sets the operating mode to the normal mode.

Figure 6:
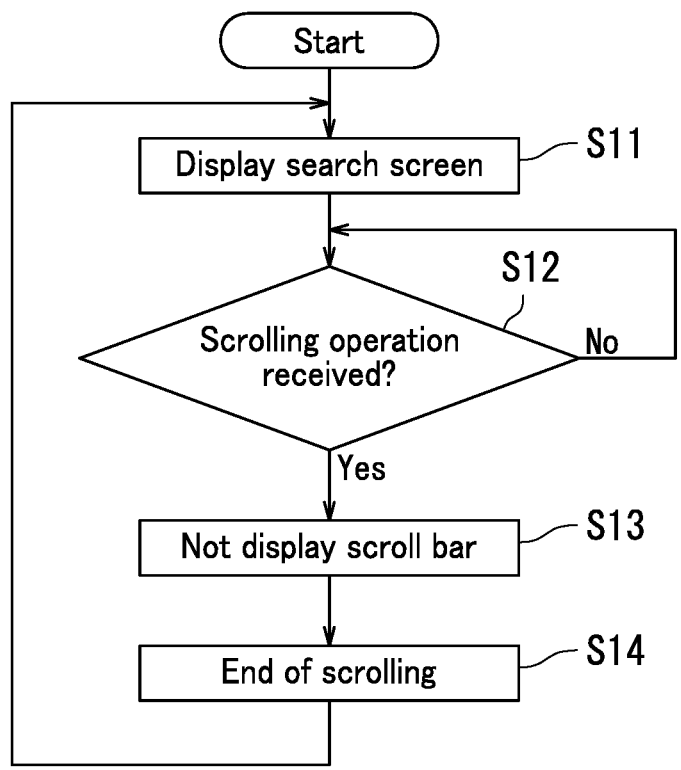
FIG. 6 is a flowchart depicting non-display processing in the first embodiment of the present disclosure.

The following describes the non-display processing with reference to FIGS. 1 to 3 and 6. FIG. 6 is a flowchart depicting the non-display processing in the first embodiment.

The non-display processing starts in response to the communication section 13 receiving image information of the search screen A displayed on the display section 11. The operating mode is set to the non-display mode.

Step S11: The controller 15 causes the display section 11 to display the search screen A. The routine proceeds to Step S12.

Step S12: The controller 15 determines whether or not the touch sensor 12 has received a scrolling operation. When the controller 15 determines that the touch sensor 12 has received a scrolling operation (Yes in Step 12), the routine proceeds to Step 13. When the controller 15 determines that the touch sensor 12 has not received a scrolling operation (No in Step 12), the routine returns to Step 12.

Step S13: The controller 15 causes the display section 11 not to display the scroll bar 131 during scrolling of the display target area A1 of the search screen A. The routine proceeds to Step S14.

Step S14: The controller 15 detects that the scrolling of the display target area A1 of the search screen A has ended. The routine returns to Step S11.

Figure 7:
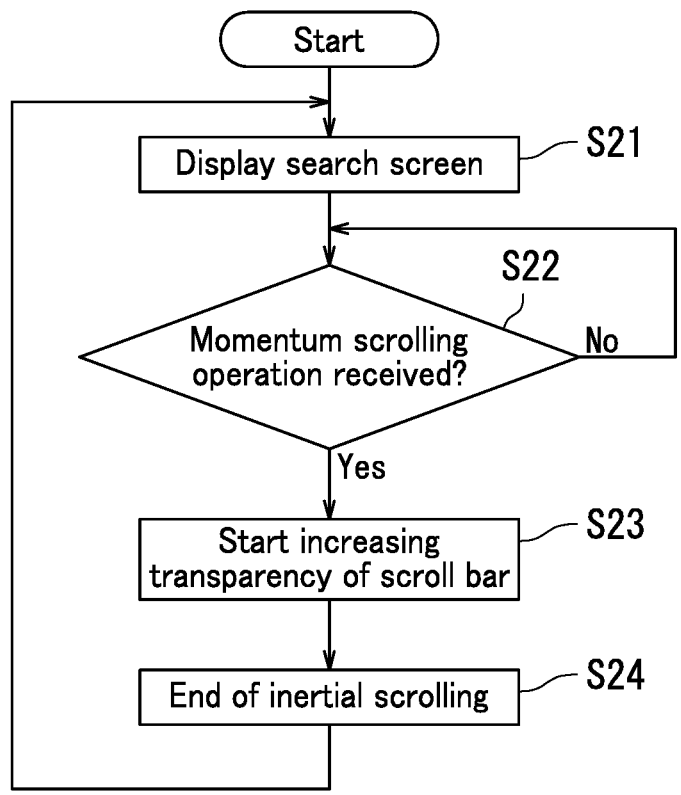
FIG. 7 is a flowchart depicting first transparency increasing processing in the first embodiment of the present disclosure.

The following describes the second transparency increasing processing with reference to FIGS. 1, 2, 4, and 7. FIG. 7 is a flowchart depicting the second transparency increasing processing in the first embodiment.

The second transparency increasing processing starts in response to the communication section 13 receiving image information of the search screen A displayed on the display section 11. The operating mode is being set to the second transparency increasing mode.

Step S21: The controller 15 causes the display section 11 to display the search screen A. The routine proceeds to Step S22.

Step S22: The controller 15 determines whether or not the touch sensor 12 has received a momentum scrolling operation. When the controller 15 determines that the touch sensor 12 has received a momentum scrolling operation (Yes in Step 22), the routine proceeds to Step 23. When the controller 15 determines that the touch sensor 12 has not received a momentum scrolling operation (No in Step 22), the routine returns to Step 22.

Step S23: The controller 15 starts increasing the transparency of the scroll bar 131 from a time when the touch sensor 12 receives the momentum scrolling operation. The controller 15 increases the transparency of the scroll bar 131 as inertial scrolling of the display target area A1 of the search screen A continues longer. The routine proceeds to Step S24.

Step S24: The controller 15 detects an end of the inertial scrolling of the display target area A1 of the search screen A. The routine returns to Step S21.

Note that the touch sensor 12 is used as the operation section in the first embodiment, which should not be taken to limit the present disclosure. For example, a keyboard may be used as the operation section. The user is allowed to change the display target area A1 of the search screen A by operating an arrow key included in the keyboard.

The display device 10 includes the display section 11, the touch sensor 12, and the controller 15 as described with reference to FIGS. 1 to 7. In response to the touch sensor 12 receiving a scrolling operation, the controller 15 causes the scroll bar 131 not to be displayed or increases the transparency of the scroll bar 131. This can increase visibility of the display screen 100 during scrolling of the display target area A1 of the search screen A, as compared to a configuration in which the scroll bar 131 is displayed on the display screen 100 during scrolling.

The display device 10 includes the touch sensor 12 as described with reference to FIGS. 1 to 7. As a result of the display device 10 including the touch sensor 12, usability in entering a scrolling operation can be increased as compared to a configuration including only a keyboard as the operation section.

The scrolling operation includes a gesture corresponding to inertial scrolling as described with reference to FIGS. 1 to 7. Upon the touch sensor 12 receiving a gesture corresponding to inertial scrolling, the controller 15 causes inertial scrolling of the display target area A1 of the search screen A. The controller 15 increases the transparency of the scroll bar 131 during inertial scrolling of the display target area A1 of the search screen A. Through change in transparency of the scroll bar 131 as above, the display screen 100 displayed on the display section 11 can have increased visibility during inertial scrolling of the display target area A1 of the search screen A in the display device 10.

Second Embodiment

Figure 8:
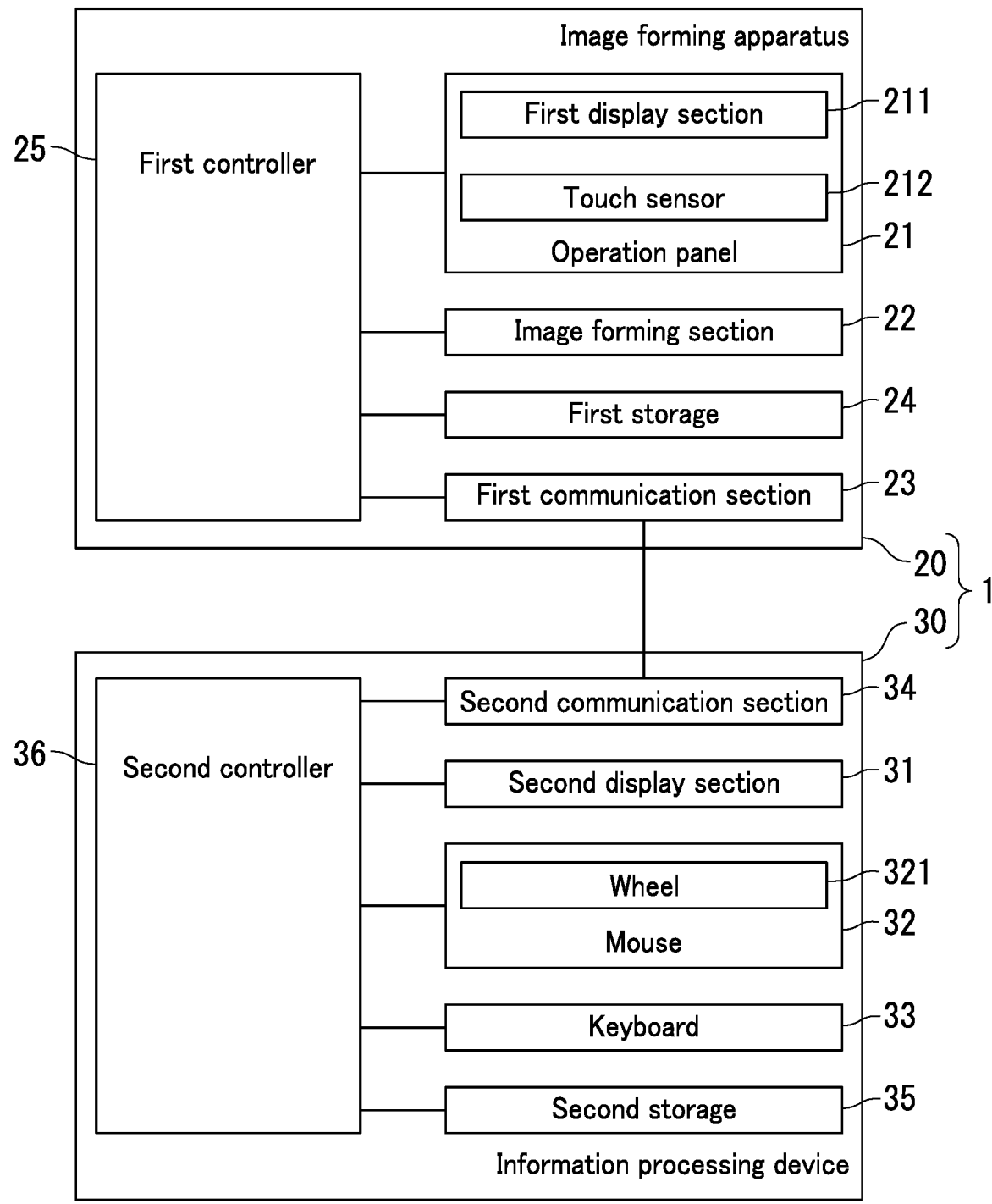
FIG. 8 is a diagram illustrating a configuration of a display system according to a second embodiment of the present disclosure.

A display system 1 according to a second embodiment will be described next with reference to FIG. 8. FIG. 8 is a diagram illustrating a configuration of the display system 1 according to the second embodiment.

As illustrated in FIG. 8, the display system 1 includes an image forming apparatus 20 and an information processing device 30. The image forming apparatus 20 and the information processing device 30 are connected to each other in a mutually communicable manner via a network N.

The image forming apparatus 20 forms an image on a sheet. The image forming apparatus 20 is an electrographic color printer, for example. The image forming apparatus 20 includes an operation panel 21, an image forming section 22, a first communication section 23, first storage 24, and a first controller 25.

The operation panel 21 receives an instruction from a user. The operation panel 21 includes a first display section 211 and a touch sensor 212.

The first display section 211 has a display surface. The display surface of the first display section 211 displays various types of screens. The first display section 211 is a liquid-crystal display panel or an organic EL display panel, for example. The touch sensor 212 generates a signal corresponding to a user gesture toward the display surface of the first display section 211. The touch sensor 212 adopts an electrostatic capacitance method or a resistive film method, for example.

The first display section 211 displays a log history screen B which will be described with reference to FIGS. 9 and 10. Specifically, the first display section 211 displays a portion of the log history screen B. The portion of the log history screen B that is displayed on the first display section 211 is changed by a scrolling operation. In the following description, the portion of the log history screen B that is displayed on the first display section 211 may be referred to as a "display target area B1".

The image forming section 22 forms an image on a sheet. The image forming section 22 includes for example a light exposure device, a charger, a photosensitive drum, a development device, a transfer device, and a fixing device. The development device supplies toner to an electrostatic latent image formed on an outer circumferential surface of the photosensitive drum. The fixing device includes a pressure member and heating member. The fixing device fixes a toner image to the sheet.

The first communication section 23 transmits and receives data to and from the information processing device 30 via the network N. Specifically, the first communication section 23 transmits screen information to the information processing device 30. The screen information indicates the log history screen B. The first communication section 23 is a communication interface.

The first storage 24 stores therein a first control program, a remote control program, and data. The first storage 24 is constituted by a storage device and semiconductor memory. The storage device is constituted by either or both an HDD and an SSD, for example. The semiconductor memory includes RAM and ROM, for example.

The first controller 25 causes the first display section 211 to display the log history screen B. The first controller 25 is a hardware circuit including a processor such as a CPU. The first controller 25 controls each operation of the operation panel 21, the image forming section 22, the first communication section 23, and the first storage 24 through execution of the first control program. The first controller 25 further includes an integrated circuit for image formation processing. The integrated circuit for image formation processing is constituted by an application specific integrated circuit (ASIC), for example.

The first controller 25 uses each of a non-display mode and a normal mode as an operating mode thereof. One of the non-display mode and the normal mode is selected as the operation mode of the first controller 25 for example through an operating mode selection screen.

The first controller 25 enables the information processing device 30 to execute remote control on the image forming apparatus 20 through execution of the remote control program. The remote control will be described later with reference to FIG. 11.

Note that the image forming apparatus 20 further includes devices that a typical printer includes, such as a sheet feeder, a conveyor device, and an ejection device. The sheet feeder feeds a sheet to the conveyor device. The conveyor device conveys the sheet fed from the sheet feeder to the ejection device. The ejection device ejects the sheet out of the image forming apparatus 20.

The information processing device 30 executes the remote control on the image forming apparatus 20. The information processing device 30 includes a second display section 31, a mouse 32, a keyboard 33, a second communication section 34, second storage 35, and a second controller 36. The information processing device 30 is a PC, for example.

The second display section 31 has a display surface. The display surface of the second display section 31 displays various types of screens. The second display section 31 is a liquid-crystal display panel or an organic EL display panel, for example.

The second display section 31 displays a log history screen B which will be described with reference to FIGS. 9 and 10. The log history screen B displayed by the second display section 31 is in synchronization with the log history screen B displayed by the first display section 211 of the image forming apparatus 20.

The mouse 32 receives a scrolling operation. The mouse 32 includes a wheel 321. The wheel 321 is used by the user to perform a wheel scrolling operation. The wheel scrolling operation is an operation by the user moving the mouse 32 while pressing down the wheel 321. The wheel scrolling operation moves the display target area B1 of the log history screen B of the second display section 31. The scrolling operation includes the wheel scrolling operation. The mouse 32 is a trackball pointing device or an optical pointing device, for example.

The keyboard 33 receives an instruction from the user.

The second communication section 34 transmits and receives data to and from the image forming apparatus 20 via the network N. Specifically, the second communication section 34 receives image information from the image forming apparatus 20. The second communication section 34 is a communication interface.

The second storage 35 stores therein a second control program, a remote control application program, and data. The second storage 35 is constituted by a storage device and semiconductor memory. The storage device is constituted by either or both an HDD and an SSD, for example. The semiconductor memory includes RAM and ROM, for example.

The second controller 36 causes the second display section 31 to display the log history screen B based on the image information received by the second communication section 34. The second controller 36 is a hardware circuit including a processor such as a CPU. The second controller 36 controls each operation of the second display section 31, the second communication section 34, and the second storage 35 through execution of the second control program. The second controller 36 causes the second communication section 34 to transmit a transmission request to the image forming apparatus 20 through execution of the remote control application program. The transmission request is a request from the image forming apparatus 20 to the information processing device 30 to transmit the screen information.

Figure 9:
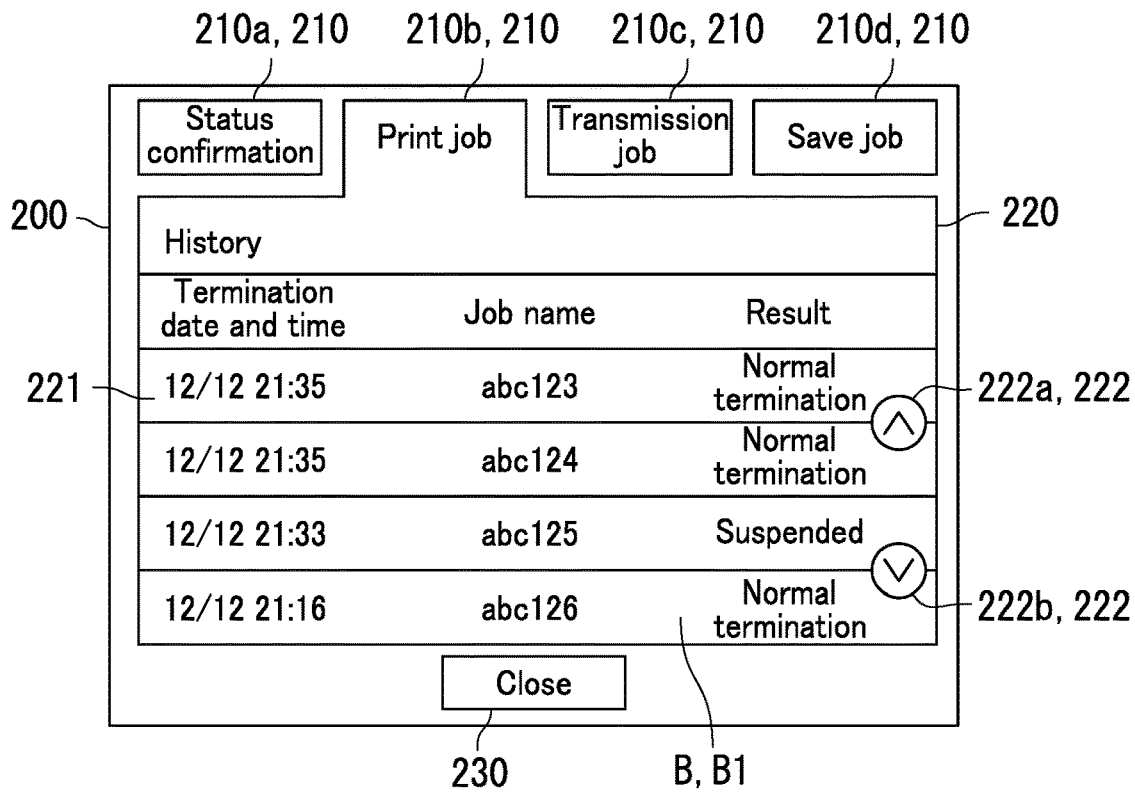
FIG. 9 is a diagram illustrating a display screen displayed on each of a first display section and a second display section in the second embodiment of the present disclosure.
Figure 10:
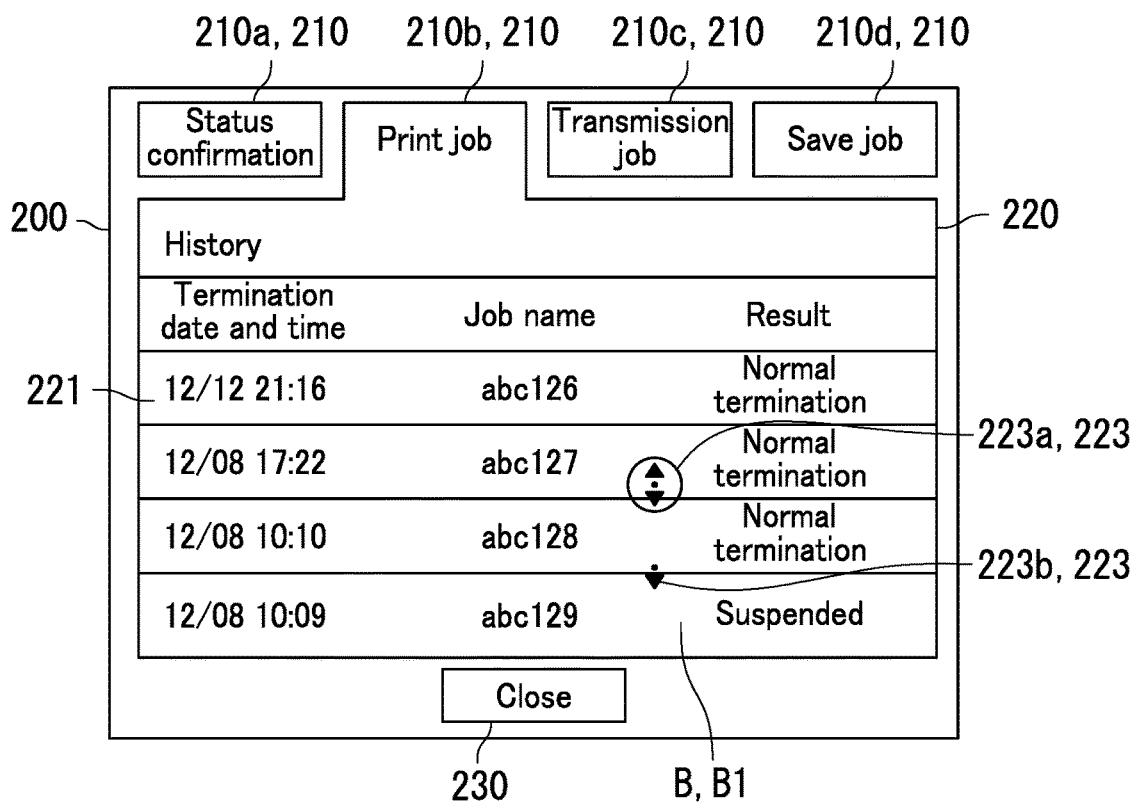
FIG. 10 is a diagram illustrating the display screen during wheel scrolling.

The following describes the non-display mode in which the first controller 25 of the image forming apparatus 20 is to be set with reference to FIGS. 8 to 10. FIG. 9 is a diagram illustrating a display screen 200 displayed on each of the first display section 211 and the second display section 31 in the second embodiment. FIG. 10 is a diagram illustrating the display screen 200 during wheel scrolling. Specifically, FIG. 10 illustrates a state in which the display target area B1 of the log history screen B is scrolled downward by a wheel scrolling operation.

As illustrated in FIG. 9, the display screen 200 displays a tab group 210, a close button 230, and an area 220 in which the display target area B1 of the log history screen B is displayed. In the following description, the area 220 of the log history screen B in which the display target area B1 of the log history screen B is displayed may be referred to as a "display area 220". The display area 220 has an area smaller than that of the log history screen B. The tab group 210 is located in an upper part of the display screen 200. The close button 230 is located in a lower part of the display screen 200. The display area 220 of the log history screen B is located between the tab group 210 and the close button 230 in a vertical direction of the display screen 200.

The tab group 210 is used to select a type of job (output processing) of log data 221 of the image forming apparatus 20. The tab group 210 includes a status confirmation tab 210a, a print job tab 210b, a transmission job tab 210c, and a save job tab 210d. The status confirmation tab 210a, the print job tab 210b, the transmission job tab 210c, and the save job tab 210d are arranged in the stated order from the left to the right in the display screen 200. The print job tab 210b is currently selected in the display screen 200 illustrated in FIG. 9.

The display screen 200 additionally displays a page change button 222. The page change button 222 is located to the right in the display area 220 of the log history screen B. The page change button 222 includes a page return button 222a and a page forward button 222b. The display target area B1 of the log history screen B is changed by a second operation. The second operation in the second embodiment is an operation by the user pressing down the page return button 222a or the page forward button 222b. When the page return button 222a is pressed down one time, the display target area B1 of the log history screen B moves upward by one page. The amount of movement of the one page is equivalent to a vertical size of the display target area B1. When the page forward button 222b is pressed down one time, the display target area B1 of the log history screen B moves downward by one page. The page change button 222 is an example of the object.

Log data 221 for each of currently displayed print jobs is displayed in the display target area B1 illustrated in FIG. 9.

As illustrated in FIG. 10, the display screen 200 displays the tab group 210 and the close button 230. During wheel scrolling, the display target area B1 of the log history screen B displayed in the display area 220 of the display screen 200 changes. Log data 221 displayed in the display target area B1 illustrated in FIG. 10 is different from the log data 221 displayed in the display target area B1 illustrated in FIG. 9. In a situation in which the operating mode of the first controller 25 is set to the non-display mode, a scroll icon 223 is displayed and the page change button 222 is not displayed on the display screen 200 during wheel scrolling, unlike the display screen 200 before wheel scrolling. The scroll icon 223 includes a main icon 223a and a forward direction icon 223b. The forward direction icon 223b indicates a direction in which the display target area B1 of the log history screen B is moved by a wheel scrolling operation.

Specifically, in a situation in which the operating mode of the first controller 25 of the image forming apparatus 20 is set to the non-display mode, the first controller 25 executes non-display processing. The non-display processing is for example processing that is executed in response to the mouse 32 of the information processing device 30 receiving a scrolling operation, and through which the page change button 222 is not displayed during the time when the display target area B1 of the log history screen B is changed.

Figure 11:
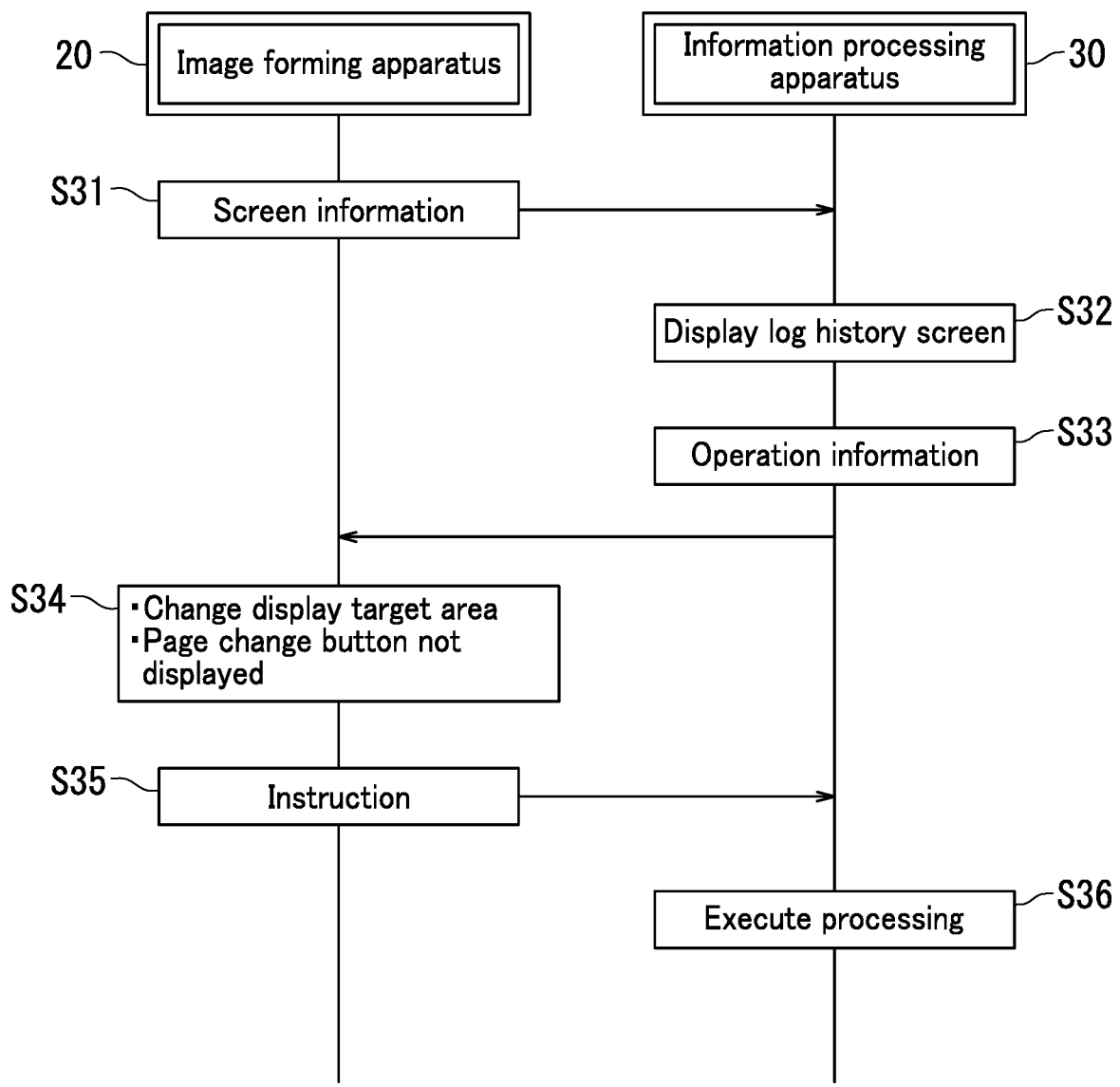
FIG. 11 is a sequence diagram depicting remote control in the second embodiment of the present disclosure.

The remote control will be described next with reference to FIGS. 8 to 11. FIG. 11 is a sequence diagram depicting the remote control in the second embodiment.

The remote control starts in response to the first communication section 23 of the image forming apparatus 20 receiving a transmission request from the information processing device 30. The operating mode of the first controller 25 is set to the non-display mode.

Step S31: The first controller 25 of the image forming apparatus 20 causes the first communication section 23 to transmit screen information to the information processing device 30. When the second communication section 34 of the information processing device 30 receives the screen information from the image forming apparatus 20, the routine proceeds to Step S32.

Step S32: The second controller 36 of the information processing device 30 causes the second display section 31 to display the log history screen B based on the received screen information. The routine proceeds to Step S33.

Step S33: The second controller 36 of the information processing device 30 causes the second communication section 34 to transmit operation information to the image forming apparatus 20. The operation information indicates a scrolling operation using the mouse 32. When the first communication section 23 of the image forming apparatus 20 receives the operation information from the information processing device 30, the routine proceeds to Step S34.

Step S34: The first controller 25 of the image forming apparatus 20 changes the display target area B1 of the log history screen B based on the received operation information while causing the page change button 222 not to be displayed. The routine proceeds to Step S35.

Step S35: The first controller 25 of the image forming apparatus 20 causes the first communication section 23 to transmit instructions to the information processing device 30. The instructions include an instruction to change the display target area B1 of the log history screen B based on the operation information and an instruction to cause the page change button 222 not to be displayed. When the second communication section 34 of the information processing device 30 receives the instructions from the image forming apparatus 20, the routine proceeds to Step S36.

Step S36: The second controller 36 of the information processing device 30 executes processing based on the instructions from the image forming apparatus 20. Specifically, based on the instructions from the image forming apparatus 20, the second controller 36 of the information processing device 30 changes the display target area B1 of the log history screen B while causing the page change button 222 not to be displayed. The routine then ends.

As described with reference to FIGS. 8 to 11, the display system 1 includes the image forming apparatus 20 and the information processing device 30. The image forming apparatus 20 includes the first display section 211, the first controller 25, and the first communication section 23. The information processing device 30 includes the second display section 31, the second communication section 34, the second controller 36, and the mouse 32. Upon the mouse 32 receiving a scrolling operation, the second controller 36 causes the second communication section 34 to transmit the operation information to the image forming apparatus 20. The second communication section 34 receives the operation information from the information processing device 30. In response to the first communication section 23 receiving the operation information, the first controller 25 causes the page change button 222 included in the log history screen B not to be displayed. In the display system 1 with the above configuration, while the user performs a scrolling operation using the mouse 32 for remote control on the image forming apparatus 20 through the information processing device 30, the display screen 200 can have increased visibility as compared to a configuration in which the page change button 222 is displayed on the display screen 200.

Embodiments of the present disclosure have been described so far with reference to the drawings (FIGS. 1 to 11). However, the present disclosure is not limited to the above-described embodiments and can be practiced in various ways within a scope not departing from the essence of the present disclosure (for example, (1) to (4) described below). The drawings are schematic illustrations that emphasize elements of configuration in order to facilitate understanding thereof, and the thickness, length, number, and so on of each element of configuration illustrated in the drawings may differ from actual ones thereof in order to facilitate preparation of the drawings. The material, shape, dimension, and so on of each element of configuration shown in the above-described embodiments are merely examples that do not impose any particular limitations and may be altered in various ways, so long as such alterations do not substantially deviate from the effects of the present disclosure.

(1) As described with reference to FIGS. 1 to 7, the touch sensor 12 is used as an operation section in the first embodiment of the present disclosure, which should not be taken to limit the present disclosure. For example, the operation section may include, in place of the touch sensor 12, at least one of the mouse 32 and a touch pad. Alternatively, the operation section may further include for example at least one of the mouse 32 and a touch pad in addition to the touch sensor 12.

(2) As described with reference to FIGS. 1 to 7, the scroll bar 131 is used as the object in the first embodiment of the present disclosure, which should not be taken to limit the present disclosure. For example, the object may include the page change button 222. The above configuration enables the display device 10 to easily change the display target area A1 of the search screen A as compared to a configuration in which the object is the scroll bar 131.

(3) As described with reference to FIGS. 8 to 11, the first controller 25 causes the page change button 222 not to be displayed in response to the first communication section 23 receiving the operation information in the second embodiment of the present disclosure, which should not be taken to limit the present disclosure. For example, the first controller 25 may increase transparency of the page change button 222 in response to the first communication section 23 receiving the operation information.

(4) As described with reference to FIGS. 8 to 11, the page change button 222 is used as the object in the second embodiment of the present disclosure, which should not be taken to limit the present disclosure. For example, the object may include the scroll bar 131.

What is claimed is:

1. A display system comprising:
an image forming apparatus; and
an information processing device configured to execute remote control on the image forming apparatus, wherein
the image forming apparatus includes:
a first display section configured to display a first screen;
a first controller configured to cause the first display section to display the first screen based on screen information indicating the first screen; and
a first communication section configured to transmit the screen information to the information processing device,
the information processing device includes:
a second display section configured to display a second screen;
a second communication section configured to receive the screen information;
a second controller configured to cause the second display section to display the second screen based on the screen information; and
an operation section configured to receive a first operation by which a display target area of the second screen is changed,
the first screen and the second screen each include an object that receives a second operation by which the respective display target areas of the first screen and the second screens are changed,
in response to the operation section receiving the first operation, the second controller causes the second communication section to transmit operation information indicating the first operation to the image forming apparatus,
the first communication section receives the operation information from the information processing device, and
in response to the first communication section receiving the operation information, the first controller causes the object included in each of the first screen and the second screen not to be displayed or increases a transparency of the object included in each of the first screen and the second screen.

* * * * *